Dec. 5, 1933. T. J. FEGLEY ET AL 1,937,645
PUSH DRILL
Filed Jan. 10, 1933
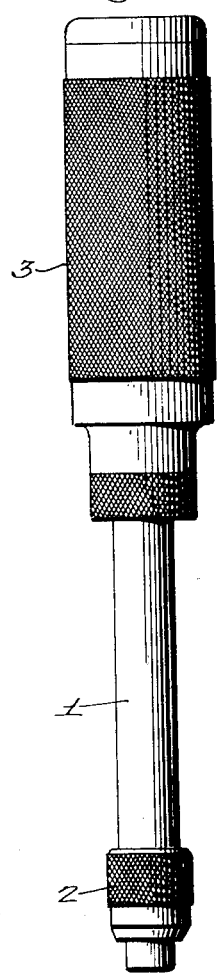
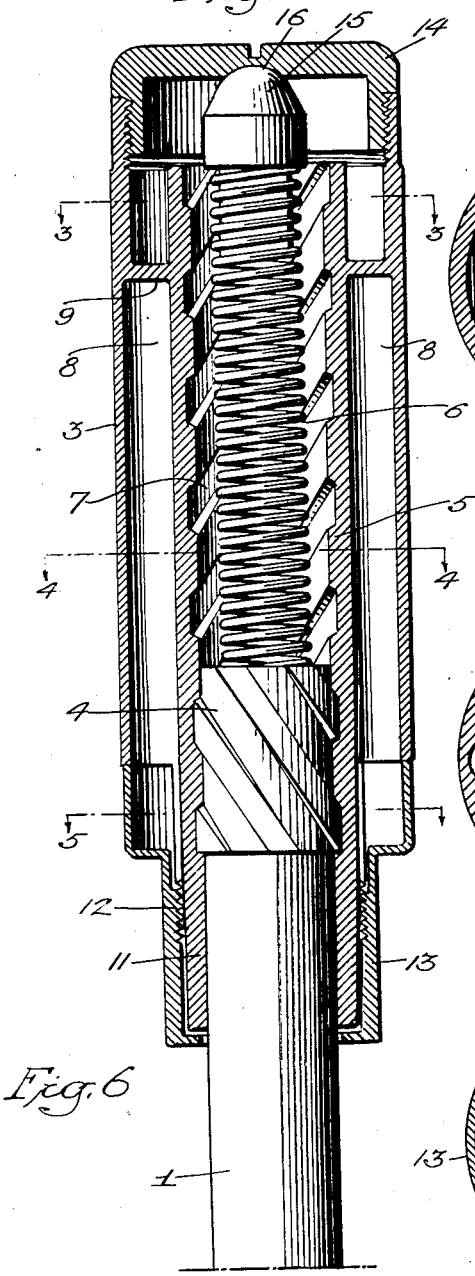
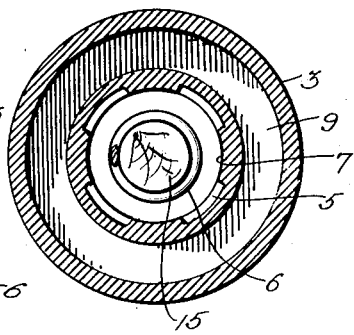
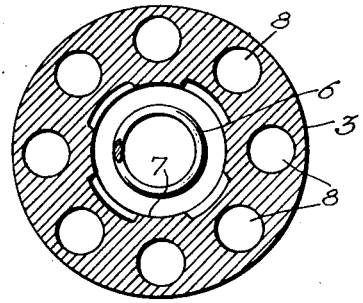
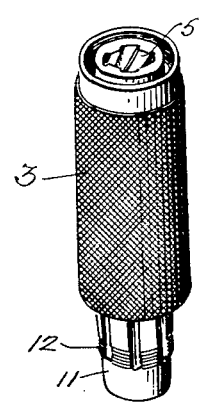
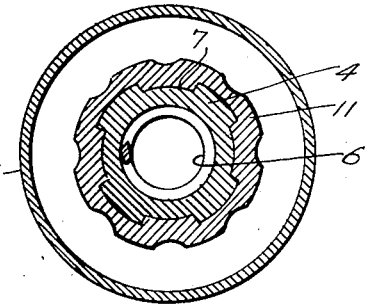
Inventors.
Thomas J. Fegley,
George O. Leopold
by their Attorneys.
Howson & Howson Patented Dec. 5, 1933

1,937,645

UNITED STATES PATENT OFFICE 1,937,645

PUSH DRILL

Thomas J. Fegley, Jenkintown, and George O. Leopold, Philadelphia, Pa., assignors to North Bro's M'f'g Co., Philadelphia, Pa., a corporation of Pennsylvania Application January 10, 1933. Serial No. 651,036

4 Claims. (Cl. 145—62)

This invention relates to improvements in push drills and similar tools, and the principal object of the invention is to materially simplify the construction and to reduce the cost of manufacturing tools of this type, and at the same time to increase their strength and durability.

To this general end, another object of the invention is to materially reduce the number of parts heretofore required in the construction of a tool of this type.

The foregoing and other objects of the invention we accomplish by means illustrated in the attached drawing, in which:

Figure 1 is an outside view of a tool made in accordance with our invention;

Fig. 2 is an enlarged longitudinal sectional view of the handle portion of the tool;

Fig. 3 is a section on the line 3—3, Fig. 2;

Fig. 4 is a section on the line 4—4, Fig. 2;

Fig. 5 is a section on the line 5—5, Fig. 2, and

Fig. 6 is a detached view in perspective of one of the principal elements of the tool assembly.

With reference to the drawing, a tool of the general character involved comprises a shaft or stem 1, hollow in the present instance and provided at one end with an adjustable chuck 2 for holding the cutting bit, and having at the other end a handle 3 through the medium of which the tool is operated. As shown in Fig. 2, that end of the stem 1 which is received by the handle 3 has an enlarged threaded portion 4 which operates in an extended nut 5 forming a part of the handle structure. A spring 6 in the interior of the handle and extending into the hollow stem 1 tends to hold the stem at one end of the nut 5 of the handle, as illustrated in Fig. 2, but when the cutting point or bit of the tool is placed upon the work and pressure exerted upon the handle 3, this spring 6 is compressed, the handle being forced longitudinally of the stem and thereby, through the nut 5, effecting a rotation of the stem and of the bit. When the pressure upon the handle is released, the spring 6 functions to return the handle to its original position with respect to the stem 1, as shown in Fig. 2, whereupon the operation may be repeated, reciprocation of the handle 3 in this manner effecting an intermittent rotation of the cutting tool in contact with the work.

In the present instance and in accordance with our invention, we produce the body portion of the handle 3 in the form of an integral casting. This casting, which is shown in Fig. 6, contains the central threaded working cylinder 7 within which the threaded portion 4 of the stem operates, as previously set forth, and which also receives the spring 6. Also as shown in Fig. 4, the casting is provided with an annular series of cylindrical bores 8 which surround the central cylinder 7 and which extend inwardly from one end surface of the cylindrical casting to a point adjacent the opposite end where they are terminated by a partition 9. The handle casting has a reduced extension 11 which projects beyond the end surface containing the open ends of the bores 8, and embraces the stem 1 at a point beyond the threaded enlargement 4. This projecting portion 11 is provided with external threads at 12 for reception of a cap member 13 which embraces the extension 11 and constitutes a closure for the open ends of the bores 8. The bores 8 are thus adapted to constitute chambers for reception of the bits or drills forming a part of the tool, which bits may be retracted from their chambers by backing off the member 13 from the threaded extension 11 of the handle.

The opposite end of the handle member is internally threaded for reception of a cap 14 which, when threaded into position, closes the open end of the body member and constitutes a retainer for the spring 6. The spring carries at that end a seat member 15 having a surface which fits into a correspondingly formed recess 16 in the inner surface of the cap 14, as shown in Fig. 2, to thereby center the spring in the bore 7.

It will be seen that the entire handle portion consists of but three parts, namely, the main body portion and the caps 13 and 14. The body portion may readily be formed by die casting, which obviates the necessity for any extensive machining operations. It will also be noted that by threading the stem 1 and producing the handle in the form, in effect, of an extended nut, it is possible to maintain the overall length of the tool at a minimum for any given length of stroke. By reason also of the integral character of the handle portion, assembly of the tool is materially simplified, which further reduces the cost of manufacture, and the tool is of exceptional strength and durability.

We claim:

1. A tool of the character set forth comprising an integral handle member incorporating a longitudinal threaded working cylinder and a plurality of longitudinal chambers embracing said cylinder and terminating at one end in an end surface of the handle, a threaded stem operative in the cylinder and projecting from one end thereof, a chuck at the outer end of said stem, a spring in said cylinder normally resiliently retaining the stem at one end of the cylinder, and a detachable cap for each end of the handle member respectively closing the open end of said cylinder and said longitudinal chambers.

2. A tool of the character set forth comprising an integral handle member incorporating a longitudinal threaded working cylinder, a threaded stem operative in the cylinder and projecting from one end thereof, a plurality of longitudinal chambers extending inwardly from the last-named end of the handle member, a spring in said cylinder normally resiliently retaining the stem at that end of the cylinder from which it projects, and caps releasably secured at opposite ends of said handle member, one of said caps constituting a closure for the open end of the cylinder and the other of said caps constituting a closure for said chambers.

3. A tool of the character set forth comprising an integral handle member having a reduced extension at one end, a plurality of chambers extending longitudinally of said member from the inner end of said extension, a central cylindrical threaded working cylinder extending longitudinally through said handle member and through said extension, the threads of said cylinder terminating short of the end of said extension, a stem having a threaded enlargement adapted for operation in said cylinder and projecting from the end of said extension, a cap releasably secured at the opposite end of the handle member and closing the open end of said cylinder, and a second cap releasably secured on said extension and closing the open ends of said chambers.

4. A tool of the character set forth comprising an integral handle member incorporating a threaded longitudinal working cylinder and a longitudinal chamber for reception of a cutting bit, a threaded stem operative in the cylinder and projecting from one end thereof, a cap releasably secured to the handle member and closing the other end of the cylinder, and a second cap at the opposite end of the handle and closing said chamber.

THOMAS J. FEGLEY.
GEORGE O. LEOPOLD.